(12) United States Patent
Elkarat et al.

(10) Patent No.: US 7,945,262 B2
(45) Date of Patent: May 17, 2011

(54) GLOBAL LOCATION REGISTERS IN ROAMING CELLULAR TELEPHONY

(75) Inventors: Shany Elkarat, Tel-Mond (IL); Reuven Della-Torre, Ramat-Gan (IL); Michael Semama, Doar-Na Efraim (IL)

(73) Assignee: StarHome GmbH, Zurich (CH)

( * ) Notice: Subject to any disclaimer, the term of this patent is extended or adjusted under 35 U.S.C. 154(b) by 880 days.

(21) Appl. No.: 11/878,379

(22) Filed: Jul. 24, 2007

(65) Prior Publication Data

US 2008/0020760 A1    Jan. 24, 2008

Related U.S. Application Data

(60) Provisional application No. 60/832,619, filed on Jul. 24, 2006.

(51) Int. Cl.
*H04M 1/00* (2006.01)

(52) U.S. Cl. .................. 455/435.1; 455/435.2; 455/434; 455/433

(58) Field of Classification Search ............... 455/432.1, 455/432.3, 434, 435.1, 435.2, 449, 433
See application file for complete search history.

(56) References Cited

U.S. PATENT DOCUMENTS

| | | | |
|---|---|---|---|
| 6,643,511 B1 * | 11/2003 | Rune et al. | 455/433 |
| 6,693,894 B1 * | 2/2004 | Andersson et al. | 370/352 |
| 7,031,707 B1 | 4/2006 | Rune et al. | |
| 2002/0004394 A1 * | 1/2002 | Tsai et al. | 455/432 |

FOREIGN PATENT DOCUMENTS

| | | |
|---|---|---|
| CA | 2567179 | 2/2006 |
| WO | WO 2006/030443 | 3/2006 |
| WO | WO 2008/012815 | 1/2008 |

OTHER PUBLICATIONS

Communication Relating to the Results of the Partial International Search Dated Nov. 23, 2007 From the International Searching Authority Re.: Application No. PCT/IL2007/000930.
International Preliminary Report on Patentability Dated Feb. 5, 2009 From the International Bureau of WIPO Re.: Application No. PCT/IL2007/000930.
ETSI "Digital Cellular Telecommunications System (Phase 2+); Universal Mobile Telecommunications System (UMTS); Gateway Location Register (GLR); Stage2 (3GPP TS 23.119 Version 6.0.0 Release 6); ETSI TS 123 119", ETSI Standards, European Telecommunications Standards Institute, 3-CN2; 3-CN4(V600): 1-129, 2004. p. 7-16, 78-79.
International Search Report and the Written Opinion Dated Feb. 4, 2008 From the International Searching Authority Re.: Application No. PCT/IL2007/00930.

* cited by examiner

*Primary Examiner* — Jean A Gelin

(57) ABSTRACT

A global location register (GLR) provides a proxy for visitor location registers to the home location registers to avoid updating of the external network with location update notifications upon transfer of a roaming user between visitor location registers. The standard GLR is extended by being configured with multiple addresses, has a soft shutdown procedure, has a blacklist mechanism, a searching facility for finding lost roaming users, and has a mechanism for overcoming ambiguities in local identification numbers assigned by visitor location registers.

16 Claims, 6 Drawing Sheets

GLOBAL LOCATION REGISTERS IN ROAMING CELLULAR TELEPHONY

RELATIONSHIP TO EXISTING APPLICATIONS

The present application claims priority from U.S. Provisional patent application No. 60/832,619, filed Jul. 24, 2006, the contents of which are hereby incorporated by reference.

FIELD AND BACKGROUND OF THE INVENTION

The present invention relates to global location registers in cellular networks and, more particularly, but not exclusively to methods and apparatus for improving their integration into the cellular network in which they are being used.

The global location register has two principle uses, firstly there is the originally intended use of reducing the level of international signaling by obviating the need to send an update location signal to a home location register every time a roaming user moves from one visitor location register to another. The second use is to reduce the opportunities for the home network to redirect the roaming user to some other preferred network.

The operation of the global location register and its context in the light of the above two uses is now explained.

The global location register, or GLR, is a node which is positioned between the VLR and/or Serving GPRS Support Node (SGSN—responsible for the delivery of data packets from and to the mobile stations within a geographical service area.) and the HLR. The GLR optimizes the location updating and the handling of subscriber profile data across network boundaries. When a subscriber roams, the GLR emulates the VLR and SGSN for the HLR in the home network. The GLR thus relays all traffic between the HLR and VLR or SGSN, keeping track of the latest location of the roaming user in the process. The HLR only needs to know about the GLR and thus there is no need to tell the HLR about the latest VLR update locations of the roaming users as he moves around the network.

By handling most of the location procedures without involving the HPMN, the GLR happens to provide an anti-Traffic Redirection feature as well, in that without the update location messages the home network has no opportunity to operate its traffic redirection. The GLR is defined by the 3GPP standards, and is referenced by ETSI specifications 23.119, 29.119, 29.120.

Concerning traffic redirection, there are many mobile or cellular network operators, or providers, in the world, usually more than one in a single country. These network operators include, but are not limited to, operators who provide mobility services using GSM, GPRS, 3G, CDMA, TDMA, PHS, WCDMA, IDEN and WLL technologies or their variants. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming".

A cellular network with which a cellular subscriber has a direct billing relationship is often referred to as the Home Public Mobile Network (HPMN) or as the home network of the subscriber. If the subscriber is in a network with which it does not have a direct billing relationship, the serving network is referred to as the Visited Public Mobile Network (VPMN) or as the visited network. The subscriber is referred to as an inbound roamer by the VPMN. The same subscriber is referred to as an outbound roamer by the HPMN. In such a case, the inbound roamers are treated as temporary subscribers from a service availability perspective, while the billing for usage incurred by them is through inter-carrier settlements via the home network of the subscriber.

In recent years, the revenues to network operators from home subscribers have consistently declined due to increased competition and resultant pricing pressures. On the other hand, revenues from roamers have consistently grown in the same period due to increased mobile penetration in local markets and an increase in travel. Moreover, roaming revenues are high-margin revenues that typically comprise between 8-25% of the total network operator revenues. Hence, protecting the existing roaming revenues and increasing them further has become an important priority for network operators worldwide.

VPMN operators, aware of the growing significance of inbound-roamer revenues for their profitability, do their best to protect and further increase their share of roaming revenues, gained from inbound-roaming in their service areas. An inbound roamer himself may also have his own preferences, based on attractive roaming rates, availability of services, etc.

HPMN operators have preferences with regards to different VPMNs to be used by their subscribers when roaming abroad. Many network operators have partnership agreements with each other that include more favorable roaming charges between then. Some operators also own or are business-grouped with networks in various countries. These operators would like to make sure their outbound-roamers stay within the group, or roam in preferred networks.

There are currently some products in the mobile cellular market which help HPMN operators redirect network selection of roaming mobile cellular phones.

Such products are offered, for example, by StarHome GmbH.

These products typically work in association with the HPMN (the home network) to issue various rejection messages in response to registration attempts of roamers trying to register to a VPMN which is not preferable as far as the operator of the HPMN is concerned. Such a rejection message causes the mobile unit/handset, which is generally kept in an automatic network selection mode, to search for another network. Networks selected by the handset may continue to be rejected by the HPMN using such rejection messages, until the handset eventually chooses the network preferred by the HPMN.

In GSM networks, the above products monitor the update location SS7/MAP messages that are sent by the mobile unit as registration messages to the VPMN and then on to the HPMN. Rejection may be by not replying at all, so that the request times out, or it may be by actually sending a rejection signal to the VPMN. The product may be based on a monitor or probe placed on the SS7/MAP signaling lines.

Alternative products send a list of available networks in order of preference to the individual handset. The list is typically provided by Over the Air SIM update and is combined with a SIM applet. The list is used by the handset to search for available VPMNs in order.

Roaming redirection to preferred networks is now discussed with reference to FIG. 1, which illustrates deployment of a prior art redirection unit. A redirection unit 120 may be deployed on the international SS7 signaling lines 115 in association with the home network (HPMN) 110 of mobile unit 140. The redirection unit may comprise a probe part 130.

Alternatively as mentioned the redirection unit can be implemented as a relay, thus forming part of the signaling path itself.

The probe part 130 picks up passing signals to carry out detection of roaming activity by mobile units, such as unit 140, in a roaming environment 150, such as a foreign country to which home network 110 does not extend.

The home network 110 is the network which the roaming unit 140 is subscribed to. The roaming unit roams in a roaming environment 150, which includes a number of mobile networks, VPMN 1-3 in this example, which are technologically compatible with the roaming mobile unit 140 and which the roaming mobile unit 140 may use.

The home network 110 may have preferences over the VPMNs, for example, the home network 110 may prefer a network which belongs to the same parent company. Utilizing the redirection unit 120, the home network 110 may attempt to manipulate the mobile unit 140 into selecting a network which it regards as preferable.

The redirection unit 120 may send a manipulative output, through an output port 190. The manipulative output may include a rejection message sent in response to the detection of roaming activity in a non-preferred network, say VPMN 1 in the given example. The mobile unit attempts to register to non-preferred network VPMN 1, and the attempt is rejected. The mobile unit 140 now automatically searches for another network. It may find VPMN 1 again, or it may find VPMN 2 or VPMN 3. If it finds VPMN 1 or 3 it is rejected and continues searching. At some stage it finds VPMN 2. The selection is accepted and registration is completed.

Reference is now made to FIG. 2 which is a flow chart illustrating an exemplary redirection process, in a GSM environment, by the home network (HPMN), according to prior art.

When a visited network (VPMN) network communication base station receives a registration message—an update location (UL) MAP message from the mobile handset 210, trying to roam in the VPMN, the message is forwarded to a Visitors Location Register (VLR) 220, which is a local database maintained by the VPMN to track visiting mobile unit users while the users are roaming in the VPMN.

The HPMN receives the update location message 230, and would normally register the location of the mobile unit in an HLR—The main database of permanent subscriber information for the HPMN.

A responding rejection message is then sent 240 to the VLR in the VPMN from a Home Location Register (HLR) of the HPMN, or from a redirection system, emulating the HLR for this purpose, which is deployed in the HPMN.

The rejection message is forwarded to the mobile unit (MU) 250.

The mobile unit/handset (MU), which is typically in an automatic network selection mode, automatically issues a preset standard number of attempts to register for the visited network by repetitive sending of the UL message for the VPMN to the home network 260.

According to the GSM standard, a mobile unit is preconfigured to issue four such registration attempts, and then search for another network. The reason for this is that users have the facility to hand-pick the desired network. The standard requires providers to honor the handmade selections of the users.

The home network thus manipulatively rejects these UL messages, and the mobile unit is maneuvered to search for another VPMN network in this successful redirection 290. A second found VPMN, in its turn, may also be rejected by the HPMN, and so forth until a HPMN preferred network is finally found.

As mentioned above, handsets are provided with a mode in which the user is able to manually select a network. In this manual mode, the mobile unit/handset shows a list of available networks to the user. The user selects one of the available networks and the handset attempts registration onto that network. If the registration is not successful, the handset waits for a predetermined delay and tries again. According to the GSM standard, in non-manual modes the number of retries is limited to four, so that a fifth retry may be recognized as manual mode. However, if specific handsets are configured for a different number of retrials, say five, the HPMN system may be configured accordingly, say to six, for this type of handset. In manual mode, the user himself has selected a particular network, so preferred VPMN selection from the HPMN perspective should not apply and the HPMN deployed redirection unit is expected to honor the will of the handset user.

However, a majority of current handsets are kept in automatic selection mode as the manual mode is not known to most users, and the HPMN is keen on controlling or influencing the selection of a VPMN.

In any event, with the deployment of such network selection systems at the HPMN, both the operator of the VPMN and the roaming user are left dependent on the HPMN systems when trying to exercise fair competition and the freedom to choose among different networks.

Reference is now made to FIG. 3, which is a simplified block diagram illustrating a VPLMN 300 that is equipped with a Global Location Register GLR 310. VPLMN 300 has four VLRs 320.1 . . . 320.4, and ordinarily, each time a roaming unit moves from one VLR to the other an update location signal is sent to the HLR 330 of the respective roaming unit. The presence of the update location signal on the international signaling lines is an opportunity for redirection of the kind listed above. The GLR however acts as a proxy to the VLRs 320.1-320.4 for the benefit of the HLR 330 at HPLMN 340, so that the HLR sees only the GLR and the GLR actually keeps track of which mobile unit is actually at which VLR. The result is that update location messages, other than the first, do not need to cross the International signaling lines and thus the opportunity for manipulative redirection is lost.

The process is illustrated in FIG. 4. In stage 410, a registration message is issued by the mobile unit when moving between two VLRs within the visited network 300. The new location registration is recorded only by the GLR 310, in stage 420. The forwarding of this new information to the HPMN is blocked. Instead the only forwarding is that indicated in stage 430, of the initial registration to the network where the GLR is recorded at the HPMN as the current VLR. The HPMN registers only the GLR itself as a location of the roaming mobile unit, with the advantage of limiting the attempt at redirecting the selection of a visited network to the very initial stage when the unit originally registered in the visited network. The GLR is the only location that knows the actual VLR and it forwards messages to the correct VLR as appropriate.

In essence, the GLR hides the VLRs behind it so that an update location message does not need to be sent. The home network (HPLMN) takes the GLR as the current location, and sends everything there. The GLR keeps track of the actual current VLR and relays all messages thereto.

Operating a GLR is thus advantageous to reduce the opportunity for home networks to carry out roaming network selection against the interests of the current network. However the GLR also has a disadvantage in that any errors in the GLR can cause malfunctions that propagate over the entire network. Errors in the GLR are difficult to correct and also shutdown of the GLR in order to overcome errors is likely to introduce further errors since home networks do not know the actual VLR. They may thus lose track entirely of their roamers. Furthermore the GLR can introduce problems of its own. For example different VLRs are free to assign their own local identification numbers (LMSI numbers). There is no problem when two VLRs assign the same number since the different VLR address used as a prefix allows the two telephones to be distinguished. However, if a GLR is used then there is no different VLR address allowing a distinction to be made.

There is thus a need to overcome the above problems in order to make the GLR more usable.

SUMMARY OF THE INVENTION

According to one aspect of the present invention there is provided a global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, the global location register having a plurality of said addresses.

According to a second aspect of the present invention there is provided a global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, the global location register further comprising a search unit configured to search for roaming users whose current visitor location register has been lost, by sending a message for the roaming user to each visitor location register and record the visitor location register producing a reply as said current visitor location register.

According to a third aspect of the present invention there is provided a global location register apparatus for associating between a plurality of visitor location registers of a cellular network and external networks, to appear as a single visitor location register to the external network identified by a visitor location register address, said global location register configured to track roaming users from respective external networks between said plurality of visitor location registers and relay communications between said external network and a currently tracked visitor location register, thereby to avoid updating of the external network with location update notifications upon transfer of a roaming user between visitor location registers, the global location register apparatus configured with a list of external networks, and functionality to restrict operation to roaming users according to whether or not a respective external network is on said list.

According to a fourth aspect of the present invention there is provided a global location register apparatus for associating between a plurality of visitor location registers of a cellular network and external networks, to appear as a single visitor location register to the external network identified by a visitor location register address, said global location register configured to track roaming users from respective external networks between said plurality of visitor location registers and relay communications between said external network and a currently tracked visitor location register, thereby to avoid updating of the external network with location update notifications upon transfer of a roaming user between visitor location registers, the global location register apparatus configured to restrict operation to roaming users according to which one of said plurality of visitor location registers they are currently assigned to.

According to a fifth aspect of the present invention there is provided a global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, configured with a soft shutdown unit having a soft shutdown period to continue to service roaming users already being tracked by said apparatus, but passing on to said external network any new update location requests, such that a number of roaming users being serviced by said apparatus reduces over said period to enable a safe hard shutdown at the end of said period.

According to a sixth aspect of the present invention there is provided a global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, wherein at least some visitor location registers provide a local identification number to each roaming user, the apparatus comprising an assignment unit to assign a global local identification number for use in communication with a respective external network, but the apparatus using said visitor location register assigned local identification number when communicating with said visitor location register.

According to a seventh aspect of the present invention there is provided a method of extending a global location register system by adding to said system at least one member of the group comprising:

a soft shutdown procedure, a blacklist mechanism, a searching facility for finding roaming users not currently indicated at said global location register, and a mechanism for overcoming ambiguities in local identification numbers assigned by visitor location registers.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
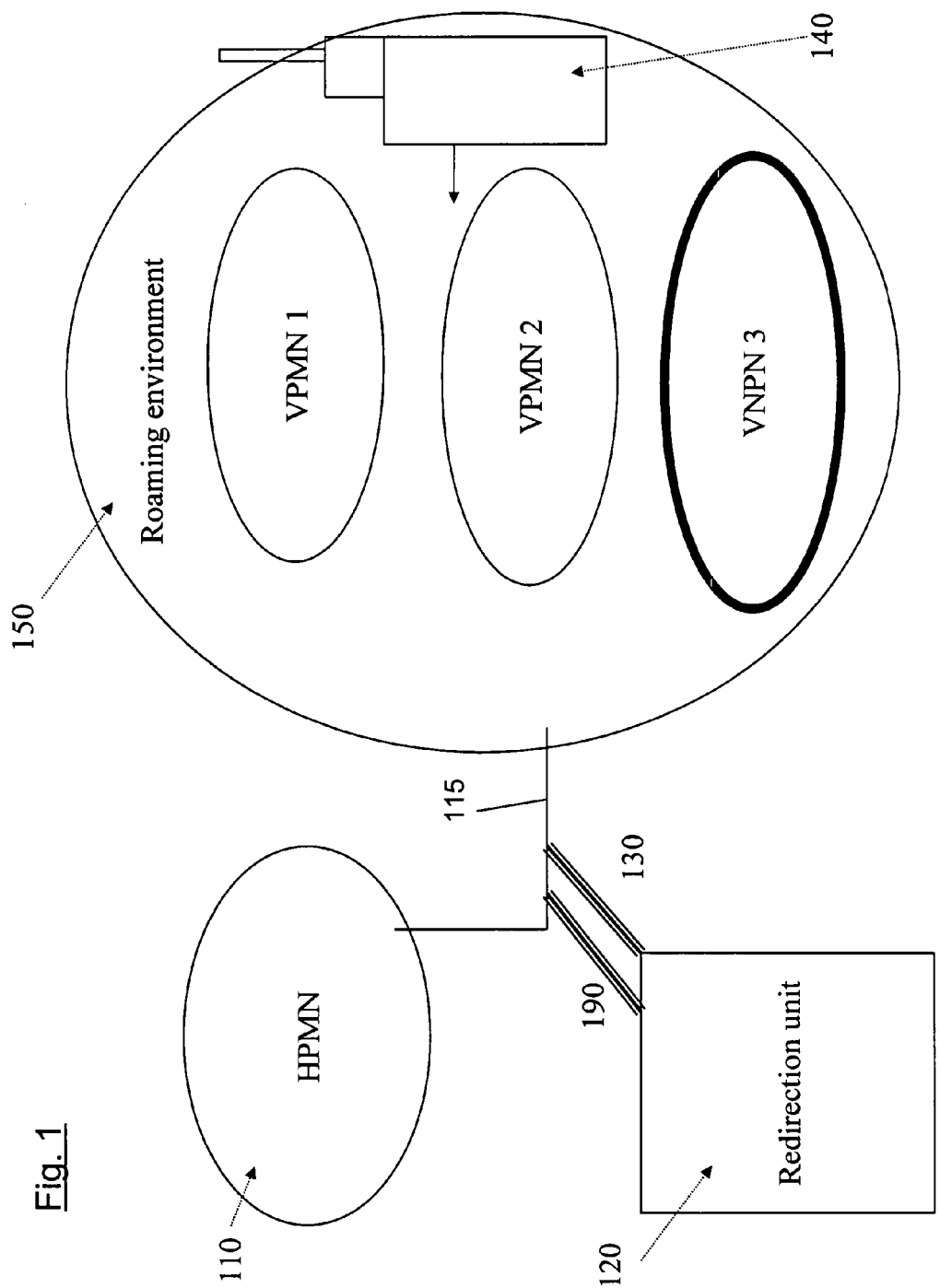
FIG. 1 is a simplified diagram showing a redirection system working between a home and a roaming environment.
Figure 2:
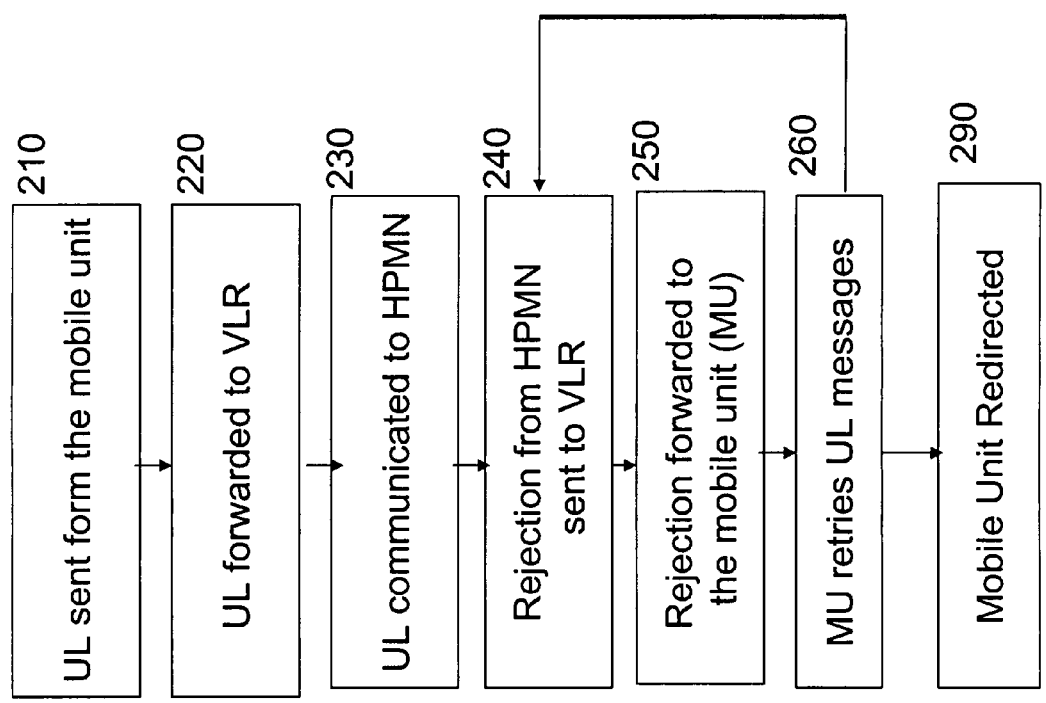
FIG. 2 is a flow chart illustrating a procedure for using the system of FIG. 1.

The present embodiments comprise an apparatus and a method for improving the integration of the GLR into a network and overcoming side effects on the network. The present embodiments also provide extensions to the GLR standards referred to above.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIGS. 1 to 4 have already been discussed in the background.

Figure 3:
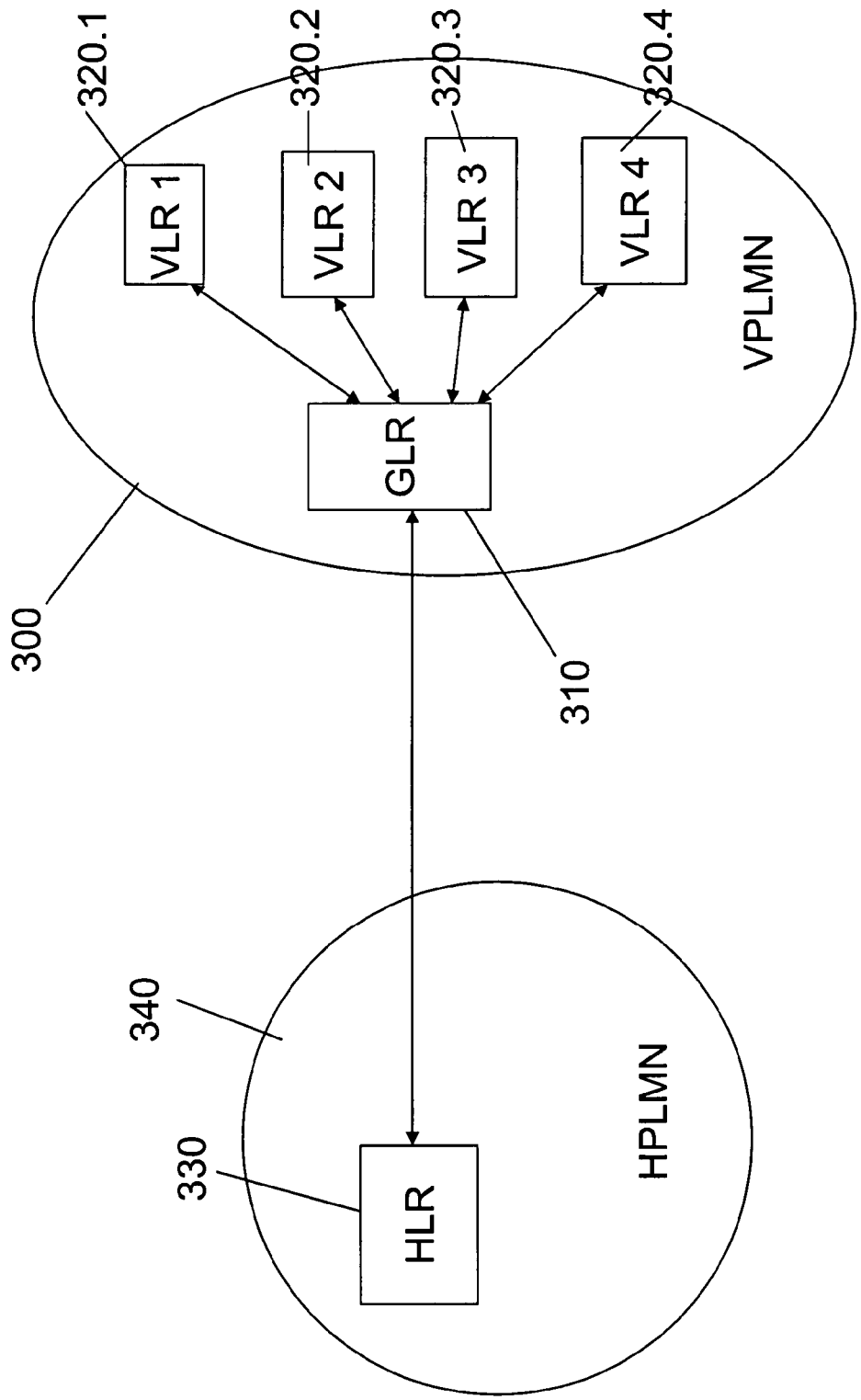
FIG. 3 is a simplified block diagram showing a GLR incorporated into a cellular network.
Figure 4:
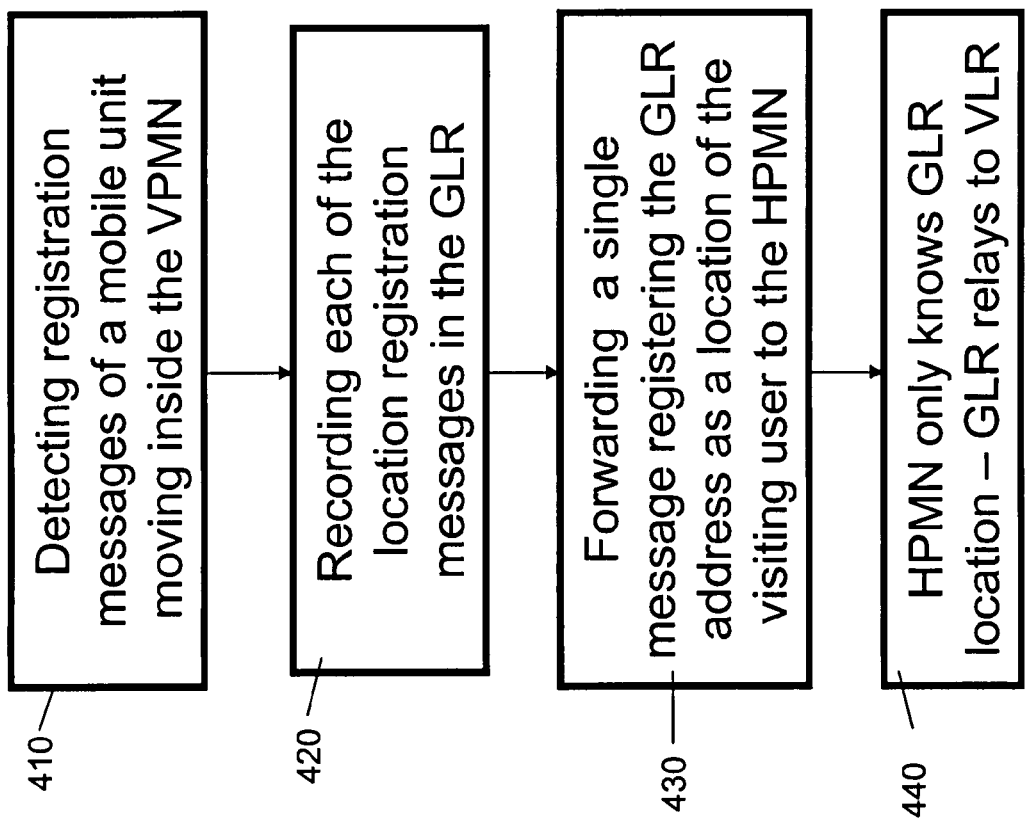
FIG. 4 is a simplified flow chart illustrating the use of the GLR of FIG. 3.
Figure 5:
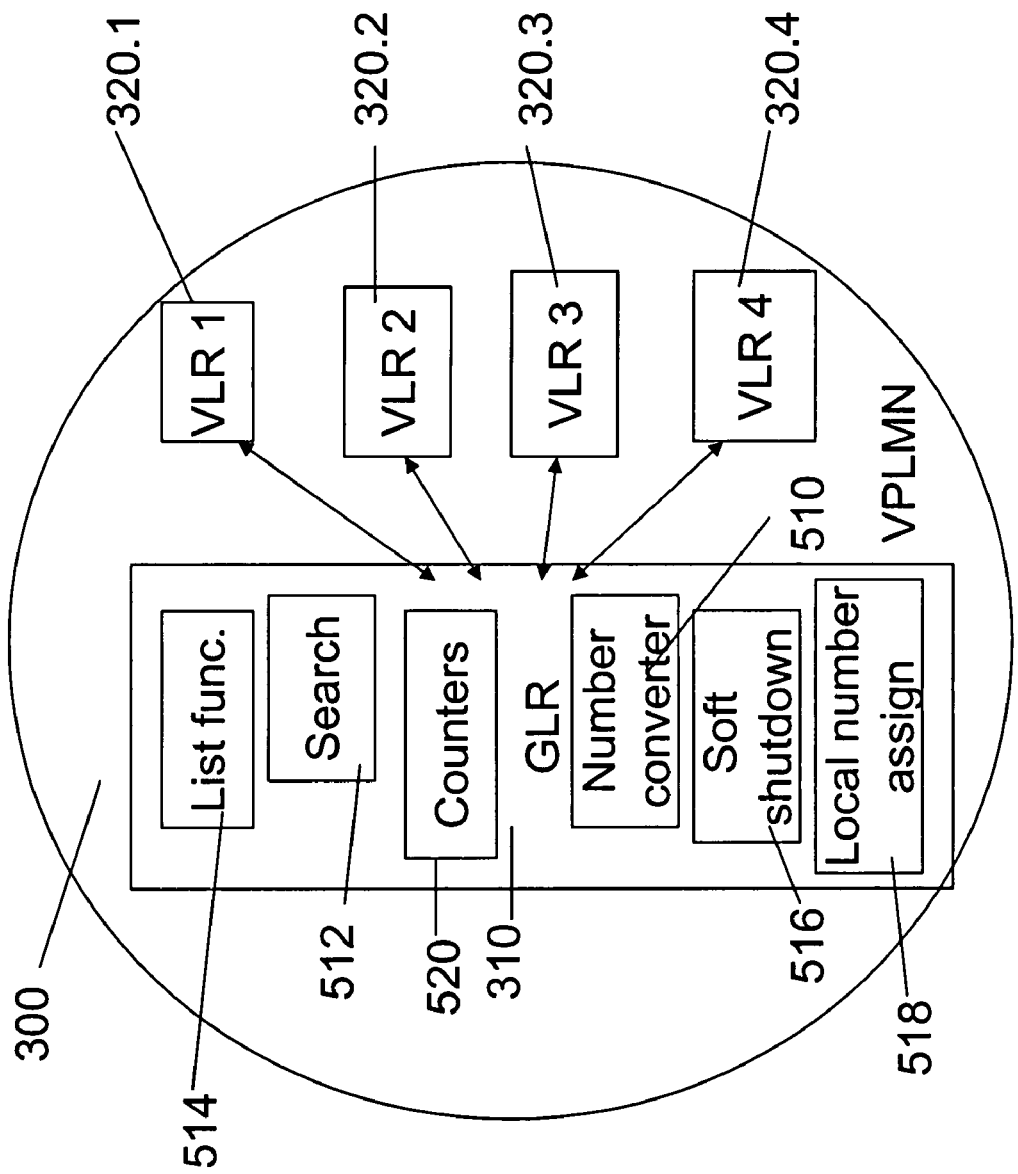
FIG. 5 is a simplified diagram showing a network using a global location register according to a preferred embodiment of the present invention.

Reference is now made to FIG. 5, which is a simplified diagram illustrating a global location register (GLR) of the kind shown as 310 in FIG. 3. The global location register as described associates between the visitor location registers of the current cellular network and external networks. The GLR appears as a single visitor location register to the external network, and is identified by a visitor location register address, to which all messages to the mobile user are directed. The global location register tracks the individual roaming users between the different visitor location registers of the current cellular network and relays communications between the external network and the visitor location register on which a given cellular user is currently located. The GLR thus avoids the need to update the external network with location update notifications every time a roaming user transfers between the different visitor location registers of the network. The GLR has a number converter 510 for converting addresses so that all messages from the outside are readdressed to the appropriate VLR and all addresses from the VLR are addressed to the appropriate HLR. The conventional number converter has a single address for the GLR which is reported to the HLR and VLR respectively. In the embodiment of FIG. 5, however, the GLR has multiple addresses, at least as indicated to the HLR. Thus the GLR looks to the HLR like numerous virtual VLR's.

Figure 6:
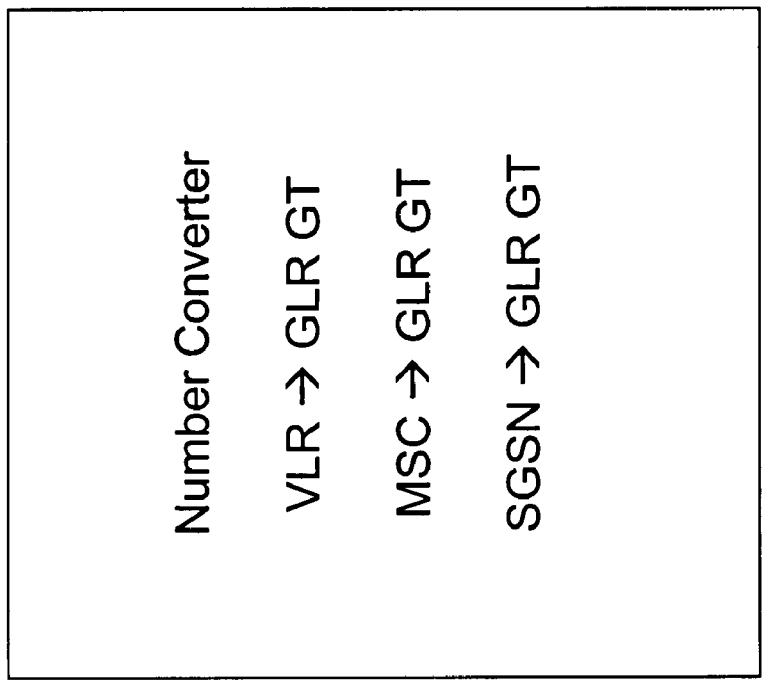
FIG. 6 is a simplified diagram illustrating the number converter of FIG. 5 in greater detail.

The virtual VLR assigned to the individual mobile user may be selected according to the VLR currently being used, or for that matter an MSC (mobile switching center) currently being used. This has the advantage that should the GLR break down it may still be possible to trace the mobile user. However the individual user retains the same virtual VLR throughout the course of roaming via that VLR, so that the initial aim of saving on update location signaling is still fulfilled. FIG. 6 shows a more detailed view of the number converter 510, indicating the number conversions that are carried out. A given VLR is initially converted to a corresponding GLR GT number. Likewise, an initial MSC number is converted to a given GLR GT number, and a given SGSN number is converted to a corresponding GLR GT number.

The number converter 510 thus acts as an assignment unit and assigns one of the GLR's multiple addresses, a virtual VLR, to any given roaming user.

The virtual VLR number gives a clue to the current location of a given roaming user, but roaming users are likely to move to other VLRs over the course of their roaming. The GLR is generally the only location on the network that knows the absolute location of the roaming user, and thus the roaming user is liable to be lost if the GLR loses track. The GLR may lose track if for example it is switched off and then on again or if there is a system crash or a file failure. The GLR 310 thus additionally may include a search unit 512 to search for roaming users whose current visitor location register has been lost. The search unit sends a message for the roaming user to each visitor location register. Only one of the VLRs sends a positive reply, and the search unit records the visitor location register producing the positive reply to be the current visitor location register.

A GLR used primarily for countering network preference selection would thus principally be of interest against networks known to prefer other networks. Foreign networks belonging to the same commercial grouping or foreign networks known not to use network preference selection need not be targeted. Again, VLRs where there is very little interest from roamers, say those that do not cover tourist or business areas, need not be targeted. Furthermore a network may include legacy VLRs that are incompatible with the GLR.

For this purpose the GLR 510 may be provided with a list of external networks, and functionality to restrict operation to roaming users according to whether or not a respective external network is on the list. Thus certain foreign networks may be targeted and others left alone. The list may be a blacklist, in which case roaming users whose home network or their HLR, appear on the list may be added to the GLR and others may use the VLR as normal, thus saving on network overhead. Alternatively the list may be a whitelist, indicating those not to be given the GLR treatment.

Likewise a whitelist or blacklist may be provided of the local VLRs. Roaming users are then added to the GLR depending on which of the VLRs they are currently registered to.

In certain circumstances it may be desirable to shut down the GLR, either fully or partially. By partial shutdown is meant that the GLR is shut down in respect of a particular external network. A certain external network whose roamers were previously directed to the GLR, is now removed from the relevant blacklist and from now on its roamers are added directly to the VLRs.

Now if the GLR is simply shut down then the network will lose all record of the location of the roaming users it is currently tracing. The global location register 310 is thus preferably provided with a soft shutdown unit. The shutdown unit defines a soft shutdown period during which it continues to service roaming users already being tracked. However, the next time that the roaming user sends a location update request, the request is passed on to the home network, so that the roaming users are gradually handed off by the GLR. A safe hard shutdown becomes possible at the end of the soft shutdown period. It is considered that a period of approximately twenty four hours is suitable as a soft shutdown period.

Certain VLRs work on a system of assigning to each incoming roaming user a local number or LMSI. The LMSI is unique within the VLR. However it is possible that two VLRs may assign the same LMSI, and this can create a problem when both VLRs are accessed via a single GLR. It will be appreciated that the problem is not solved simply by using a virtual VLR. As will be recalled mobile telephones are assigned a virtual VLR according to their initial VLR. However following initial assignment, roaming users may migrate to other VLRs, and thus two mobile users can have the same virtual VLR and also have the same LMSI since they are now on different actual VLRs.

In order to solve the problem the GLR includes a global local number assignment unit 518 for assigning a global local identification number (LMSIg) to each roaming user that uses the GLR. The global location identification number is unique over the GLR and thus can be used for unambiguous identification of the roaming user. Thus messages for the given roaming user are forwarded to the correct VLR. It will be appreciated that the global local identification number is only used for communication with the external network. The GLR uses the visitor location register originally assigned local identification number when communicating with the visitor location register.

The GLR 310 features as a central management point for roaming users for the cellular network and thus is useful for gathering statistical data regarding the users. The GLR 310 may thus include counter unit 520 for gathering statistics on mobile telephone usage. Typical statistics that may be gathered include number of inbound roaming users per external network currently registered in the cellular network;

total number of registrations attempts per external network;

total number of registration attempts from external networks using voice calls;

number of registrations attempts per external network using data connections;

total number of registration attempts using data connections;

number of successful registrations per external network using data connections;

total number of successful registrations using data connections;

number of registration attempts involving given home location registers;

number of successful registrations involving given home location registers involving voice calls;

number of registration attempts involving given home location registers using data calls; and number of successful registrations involving home location registers using data calls. The above are merely examples and other statistics may of course be gathered as well.

The GLR is a standard component, as defined by 3GPP and is also referred to in copending patent applications U.S. Ser. No. 11/226,421, and WO 2006/030443.

The GLR is intended by the standards to be used primarily for the purpose of saving SS7 signaling between the home and visited network. According to the present embodiments, while this purpose is by no means negated, the GLR is used more generally for management of inbound roaming users, and the present embodiments are intended to be provided as extensions to the standard GLR.

As explained above, the extensions include the following:

1. GLR soft shutdown—a method for implementing GLR shutdown without causing repercussions that could affect the mobile network on which the GLR is installed. Without soft shutdown, shutting off the GLR may prevent roamers on that network from receiving service such as MT (Mobile Terminated) calls, since only the GLR is aware of the actual VLR serving the roamer. Soft shutdown can be of the GLR as a whole, or as mentioned can be per home network. Partial shutdown, so that the GLR concentrates only on roamers from problematic home networks can save on overhead at the roaming network. Using soft shutdown, those roaming users currently on the GLR remain until the next update location registration, which is forwarded to the home network so that the roaming user is effectively handed back to the VLRs. A soft shutdown typically takes 24 hours or so, as most telephones change their VLR within such a time frame.

The GLR Soft shut down mechanism is now considered in greater detail.

In the case that a certain HPMN is to be deactivated, that is no longer to be included on the GLR, a procedure known as Active/Deactivate is activated as follows:

The HPMN is set to "Deactivate". The GLR manages a registration process without modifying any parameters from the MAP level, that is it does not change any of the address components in the telephone communication route. The VLR/SGSN/MSC/HLR number remains unchanged. Only the SCCP routing control component is modified.

The HPMN remains defined in the Database by a list of "MCC+MNC" combination.

The GLR logic activation (for whole HPMN) "On/Off" is as follows:

"On": the GLR applies the GLR logic (MAP parameters replacement) for all the inbound roamer registrations except those related to the HPMN/VLR/IMSI black lists.

"Off": the GLR behaves as with a VLR/IMSI black list for the entire VPMN network, leaving the HPMN inactive.

When the GLR next receives an update location (UL) related to an IMSI—the International identification number of a roaming subscriber present in the GLR memory, from the HPLMN which is being deactivated, the GLR removes the IMSI's related records from the memory.

When the memory and DB empty the GLR may initiate an SNMP trap and write the relevant information in a trace file.

By receiving the SNMP trap the operator is able to shut down the GLR process without any GSM/GPRS traffic disturbance.

2. GLR black lists—as explained, the GLR black lists limit the operation of the GLR to roamers from specific home networks. Alternatively or additionally the GLR may black list specific VLRs of the visited network, which latter is useful for non-standard or legacy VLRs which may not be compatible with the GLR. As an alternative to a black list, a white list may be used. The GLR black list mechanism involves lists of VLR or HPLMN numbers for which the GLR manages the registration process without modifying any parameters from the MAP level routing numbers. That is to say there is no change in the VLR/SGSN/MSC/HLR number or routing sequence. Only the SCCP number of the SS7 routing protocol is modified.

3. Multiple GT number allocation—the GLR itself has to be addressed by the external networks. The GLR may, as explained, use multiple self addresses while communicating with the HLR, rather than a single address. The multiple addresses in effect provide a virtual VLR for each actual VLR, and have the affect of easing the process of finding the roamers in case the GLR has a problem. The GLR looks to the external network as a large number of VLRs. However, as mentioned, individual roamers keep the same number so the GLR still fulfils the original aim of saving update location requests over the international signaling networks.

Multiple GT numbers allocation involves an address conversion function in the GLR. The Address Conversion function in the GLR is performed when the GLR receives an updateLocation message from the VLR or the updateG-PRSLocation message from the SGSN, and the HLR is supposed to be updated regarding the new location. At this point the GLR carries out address conversion so that it substitutes itself for the actual VLR.

The GLR is defined with multiple GT numbers, each one of which is an address by which outside networks find the GLR. Preferably Each VLR/MSC or each SGSN number correspond to their own GLR GT.

The GLR then converts visited node addresses as shown in FIG. 6 referred to above:
  A VLR Number converts to a GLR GT that corresponds to the VLR Number
  An MSC Number converts to a GLR GT that corresponds to the MSC Number
  An SGSN Number converts to a GLR GT that corresponds to the SGSN Number
  An HLR Number converts to a GLR Number 4. A method for searching for the roaming subscriber among the VLRs of the roaming network, by the GLR, given that the location, meaning the actual VLR, of the roaming subscriber is unknown. As explained, a searching unit 512 sends an SMS of type zero to all the VLRs, and then whichever VLR provides an answer is the one where the roaming subscriber is located. The GLR presumably originally registered the roaming subscriber but in certain cases the registration may be lost. For example the GLR may have been shut down and opened again. Alternatively there may have been a more general problem with the cellular network. In any event the search unit provides an error correction facility for the GLR.

In more detail, the search unit provides for VLR/SGSN number retrieval for a currently unknown IMSI. The reason the IMSI is currently unknown can be due to an error that has appeared in the GLR system.

The GLR may at some stage receive a message such as 'provideRoamingNumber' or 'MTForwardSM' which defines a roaming user by an IMSI or international identity number which is not currently recognized by the GLR. That is to say the IMSI is not currently found in the server memory or in the persistent storage. In this case the GLR sends an 'MTForwardSM' with 'SMS Type 0' to each one of the network VLRs/SGSNs, meaning it sends a blank SMS to elicit a response. In the case of an initial MTForwardSM the blank SMS may be sent to an SGSN.

If multiple GLR addresses are used then the GLR may begin by sending the 'SMS type 0' message to that VLR corresponding to the GLR GT received. However, as mentioned, this is not fullproof since the roaming user is allowed to migrate between VLRs without changing the GLR GT.

Based on the MTForwardSM response the GLR is able to determine the VLR in which the subscriber is currently located. This is clear from the response to the 'SMS Type 0' message, which may be positive or negative as follows:
  Positive response—Subscriber is located
  Negative response (i.e. Absent Subscriber)—Subscriber is not in this VLR area.

Upon receiving the positive response, the GLR may update the VLR/SGSN number in its own memory and in the persistent storage and relay the provideRoamingNumber or initial MTForwardSM to the VLR/SGSN.

Various search strategies may be used. For example, the GLR may start the searching process with a specific VLR, then search its neighboring VLRs, and then their neighboring VLRs. This method may shorten the search time and save research resources.

5. Local identity number (LMSI) handling. LMSI handling, as explained above, refers to the issue of VLRs who assign a local ID number to arriving roaming subscribers. The different VLRs assign the ID numbers independently so that two different VLRs can assign the same number to two different subscribers, creating a conflict at the GLR, since incoming messages to the two subscribers have the same address. The solution requires the GLR to transform the LMSI local ID number to a global local number that is unambiguous for the GLR.

LMSI Handling is now considered in greater detail.

LMSI handling refers to the transformation of the LMSI local ID number to a global number provided by the GLR. The transformation is made to the VLR-provided identity numbers and does not effect other identity numbers such as the International identity number or IMSI. There is no ambiguity with local identity numbers as long as each VLR operates alone, but when different VLRs operate together on the same GLR, identically assigned local identity numbers may need to be called by the same GLR and thus ambiguity arises, as was explained above. That is to say two VLRs may occasionally allocate the same LMSI number to different IMSIs. The GLR thus transforms each LMSI number to a number of its own, a global identification number,—so that each IMSI is uniquely identified by a global LMSI number and thus messages from the HLR uniquely identify the roaming user.

The feature may implemented in the following way:
The GLR is configured with a range of numbers to use as legitimate global identification numbers.

When an updateLocation arrives from a VLR with an LMSI provided by the VLR, the GLR transforms the number into one of its own. Then if the updateLocation is forwarded to the HLR then the GLR number the global LMSI or (LMSIg) is used. The HLR uses the LMSIg and to respond to the GLR, and when such a response from the HLR is forwarded to the VLR, the GLR recognizes the LMSIg. However it substitutes back the original VLR number for forwarding to the VLR, as the LMSIg is not recognized at the VLR.

As mentioned, not all VLRs use LMSIs. Some use the IMSI directly. Thus the GLR is given a configuration in which a flag can be set indicating whether to allocate a LMSIg always, or to allocate only if an LMSI was allocated by the relevant VLR. Thus if the flag is set then the GLR always allocates an LMSIg and uses it when forwarding to the HLR. If the flag is "off" then the GLR allocates an LMSIg only if an LMSI has been allocated. Otherwise, if the VLR is using the IMSI, the GLR also uses the IMSI.

6. A further extension is the GLR counter. As mentioned above, the GLR is a central location as far as roaming users are concerned so it provides a convenient location to obtain statistics regarding roaming usage. In the following a distinction is made between voice calls—the GSM network, and data connections—the GPRS network. Examplary statistics that may be gathered include the following:

1) The number of Inbound roamers per HPMN currently registered in the GSM network of the VPMN (excluding the GPRS network).

2) Number of Registrations attempts per HPMN from the GSM network.

3) Total number of registration attempts from the GSM network

4) Number of successful registrations per HPMN from the GSM network.

5) Total number of successful registrations from the GSM network

6) Number of Registrations attempts per HPMN from the GPRS network.

7) Total number of registration attempts from the GPRS network

8) Number of successful registrations per HPMN from the GPRS network.

9) Total number of successful registrations from the GPRS network

10) Number of registration attempts involving the HLR ($1^{st}$ UL, LSIC, Restriction etc. . . . ) per HPMN from the GSM network.

11) Number of successful registrations involving the HLR ($1^{st}$ UL, LSIC, Restriction etc. . . . ) per HPMN from the GSM network.

12) Number of registration attempts involving HLR ($1^{st}$ UL_GPRS, LSIC, Restriction etc. . . . ) per HPMN from the GPRS network.

13) Number of successful registrations involving HLR ($1^{st}$ UL_GPRS, LSIC, Restriction etc. . . . ) per HPMN from the GPRS network.

It is expected that during the life of this patent many relevant devices and systems will be developed and the scope of the terms herein, is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. Global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, the global location register having a plurality of said addresses, the apparatus further comprising a search unit configured to search for roaming users whose current visitor location register has been lost, by sending a message for the roaming user to each visitor location register and record the visitor location register producing a positive reply as said current visitor location register.

2. The global location register apparatus of claim 1, further comprising an assignment unit for assigning one of said plurality of addresses for a given roaming user.

3. The global location register apparatus of claim 2, wherein said assignment unit is configured to carry out said assigning on the basis of an initial visitor location register to which said mobile user connects.

4. The global location register apparatus of claim 2, wherein said assigning unit is configured to ensure that said assigned one of said plurality of addresses is retained by said given roaming user for an entire roaming duration.

5. The global location register apparatus of claim 1, configured with a list of external networks, and functionality to restrict operation to roaming users according to whether or not a respective external network is on said list.

6. The global location register apparatus of claim 1, configured to restrict operation to roaming users according to which one of said plurality of visitor location registers they are currently assigned to.

7. Global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, the global location register having a plurality of said addresses, the apparatus further configured with a soft shutdown unit having with a predetermined soft shutdown period to continue to service roaming users already being tracked by said apparatus, but passing on to said external network any new update location requests, such that a number of roaming users being serviced by said apparatus reduces over said period to enable a safe hard shutdown at the end of said period.

8. The global location register of claim 7, wherein said soft shutdown unit is configured to carry out said shutdown only in respect of roaming users associated with defined ones of said external networks.

9. Global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, the global location register having a plurality of said addresses, wherein some visitor location registers provide a local identification number to each roaming user and other visitor location registers do not provide a local identification number, the apparatus comprising a global local number assignment unit to assign a global local identification number distinct from said local identification number and irrespective of whether any local identification number is provided, said global local identification number being used in communication with a respective external network, but the apparatus using said visitor location register assigned local identification number when communicating with said visitor location register if said local number is assigned.

10. The global location register apparatus of claim 9, further comprising a counter unit for gathering statistics on mobile telephone usage.

11. The global location register apparatus of claim 10, wherein said counter is configured to obtain at least member of the group consisting of:
 number of inbound roaming users per external network currently registered in the cellular network;
 total number of registrations attempts per external network;
 total number of registration attempts from external networks using voice calls;
 number of registrations attempts per external network using data connections;
 total number of registration attempts using data connections;
 number of successful registrations per external network using data connections;
 total number of successful registrations using data connections;
 number of registration attempts involving given home location registers;
 number of successful registrations involving given home location registers involving voice calls;
 number of registration attempts involving given home location registers using data calls; and
 number of successful registrations involving home location registers using data calls.

12. Global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, the global location register further comprising a search unit configured to search for roaming users whose current visitor location register has been lost, by sending a message for the roaming user to each visitor location register and record the visitor location register producing a positive reply as said current visitor location register.

13. The global location register of claim 12, wherein said message is a blank text message.

14. The global location register of claim 12, wherein said search unit is configured to send said message to different visitor location registers according to a search strategy.

15. Global location register apparatus for associating between a plurality of visitor location registers of a cellular network and external networks, to appear as a single visitor location register to the external network identified by a visitor location register address, said global location register configured to track roaming users between said plurality of visitor location registers and relay communications between said external network and a currently tracked visitor location register, thereby to avoid updating of the external network with location update notifications upon transfer of a roaming user between visitor location registers, configured with a soft shutdown unit having a soft shutdown period to continue to service roaming users already being tracked by said apparatus, but passing on to said external network any new update location requests, such that a number of roaming users being serviced by said apparatus reduces over said period to enable a safe hard shutdown at the end of said period.

16. The global location register of claim 15, wherein said soft shutdown unit is configured to carry out said shutdown only in respect of roaming users associated with defined ones of said external networks.

* * * * *